United States Patent Office 2,831,865
Patented Apr. 22, 1958

2,831,865

4-SUBSTITUTED 1,2-DIARYL-3,5-DIOXO-PYRAZOLIDINES

Franz Häfliger and Rudolf Pfister, Basel, Switzerland, assignors, by mesne assignments, to Geigy Chemical Corporation, New York, N. Y., a corporation of Delaware No Drawing. Application August 1, 1955
Serial No. 525,814

Claims priority, application Switzerland August 6, 1954

1 Claim. (Cl. 260—310)

The present invention is concerned with therapeutically valuable 4-substituted 1,2-diaryl-3,5-dioxo-pyrazolidines as well as with the salts thereof with inorganic and organic bases and with the production thereof. 1,2-diphenyl-4-n-butyl-3,5-dioxo-pyrazolidine has attained great importance as a therapeutical agent for the treatment of rheumatic diseases. Patents concerning this product, e. g. British Patent No. 646,597, French Patent No. 983,378 and U. S. Patent No. 2,562,830 cover in a general manner 1,2-diaryl-3,5-dioxo-pyrazolidines which are substituted in the 4-position by a carbon structure having 2–10 carbon atoms bound over a primary or secondary carbon atom.

It has now been found that compounds of the general formula:

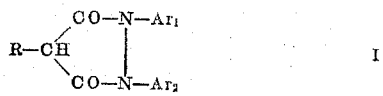

wherein:

$Ar_1$ and $Ar_2$ represent phenyl radicals which may be substituted by lower alkyl, alkoxy or alkylmercapto groups or by halogen and R represents an aliphatic hydrocarbon radical with at least 12 carbon atoms, have also interesting therapeutical properties, in particular antipyretic, antiphlogistic and analgetic activity.

The antipyretic action of these compounds is superior to that of the known analogous compounds with the smaller alkyl radical in the 4-position, which is all the more surprising as the relatively lower members of the known compounds which have 3–5 carbon atoms in the 4-alkyl radical have the most favorable therapeutical properties.

The new compounds are produced, in principle by ring closing condensation of reactive functional derivatives of correspondingly substituted malonic acids with hydrazobenzene or N-acyl hydrazobenzenes which may be substituted. The condensation is performed in the manner already described for the production of known analogous compounds. Thus, the production is characterised in that a substituted malonic acid ester of the general formula:

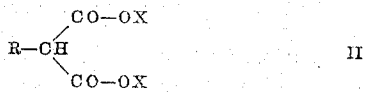

wherein:

X represents a lower alkyl radical, and
R has the meaning given above, is condensed to close the ring with a hydrazobenzene or a hydrazobenzene derivative of the general formula:

wherein Z represents hydrogen or an acyl radical which can be easily split off, and $Ar_1$ and $Ar_2$ have the meanings given above, the condensation being performed preferably in the presence of an alkaline condensation agent, or in that a substituted malonic acid derivative of the general formula:

wherein Y represents chlorine, bromine or an acyloxy group, is condensed to close the ring, preferably in the presence of an acid binding agent, with a hydrazobenzene of the general formula:

Alkali metals or compounds thereof such as alcoholates, amides, hydroxides or hydrides can be used as alkaline condensing agents for the first production process mentioned above. The condensation is performed preferably in the presence of organic solvents such as e. g. benzene, toluene, xylene, etc. and at a raised temperature, preferably between 80–160° C., any alcohol which may be liberated being continually distilled off. In particular, tertiary organic bases such as pyridine or dimethyl aniline, triethyl and also tributyl amine in the presence or absence of additional organic solvents such as e. g. diethyl or diisopropyl ether or chloroform are suitable as acid binding agents for the second reaction mentioned above. In this case, the ring is closed even at low temperatures, advantageously in the region of 0°.

Instead of substituted malonic acid diesters or dihalides, also substituted malonic acid monoester derivatives of the general formula:

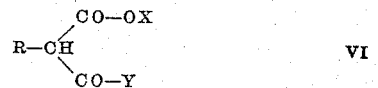

can be used as starting materials. In a first step corresponding to the second production process above mentioned, they can be condensed in the cold in the presence of an acid binding agent to form substituted malonic acid monoester hydrazides with hydrazobenzenes of the general Formula V, and in a second step corresponding to the first above production process, these can be converted into the desired end products of the general Formula I by means of alkaline condensing agents in the warm.

The substituted malonic acid diesters necessary for the reaction of the general Formula II are produced, for example by condensation of sodium malonic acid diesters with aliphatic halogen compounds having at least 12 carbon atoms. Such halogen compounds can be produced from the corresponding alcohols by reacting with inorganic acid halides as is known for some of the reactants. The substituted malonic acid halides are obtained from the esters by alkaline saponification, liberation of the acids and treatment of same with inorganic acid halides such as thionyl chloride, phosphorus pentachloride or phosphorus tribromide.

Dodecyl malonic acid diethyl ester, tridecyl-, tetradecyl-, pentadecyl-, hexadecyl-, octadecyl-, eicosyl-, hexacosyl-, ω-tridecenyl-, octadeca-9-enyl-, dihydrophytyl- and phytyl-malonic acid diethyl esters are examples of substituted malonic acid esters of the general Formula II. Apart from hydrazobenzene and the N-acetyl derivative thereof, 4-chloro-, 2,2'-dichloro-, 3,3'-dichloro-, 4,4'-dichloro-, 2,4-dichloro-, 4-bromo-, 2,2'-dibromo-, 3,3'-dibromo-, 4,4'-dibromo-, 3,5-dibromo-, 2-methyl-, 3-methyl-, 4-methyl-, 2,2'-dimethyl-, 3,3'-dimethyl-, 4,4'-dimethyl-, 4-methyl-4'-chloro-, 2,4-dimethyl-, 2,4,2',4'- tetramethyl-, 3.4.3'.4'-tetramethyl-, 4.4'-bis. tert. butyl-, 2-ethoxy-, 3-ethoxy-, 4-methoxy-, 4-methoxy-4'-methyl-, 4-ethoxy-, 4-ethoxy-4'-bromo-, 4-ethoxy-4'-methyl-, 3.3'-diethoxy-, 4.4'-diethoxy-, 2.2'-bis-methyl mercapto-, 4.4'-bis-methyl mercapto- and 4.4'-bis-ethyl mercaptohydrazobenzene can be used as hydrazobenzenes of the general Formulas III and V; all of which are described in Beilstein's Textbook of Organic Chemistry. Also the N-acetyl derivatives of the above compounds and other hydrazobenzenes substituted as defined can be used. They can be produced in the manner described for the known compounds.

Whilst in all the above modifications of the process, compounds are obtained direct by the ring closing condensation which already contain the higher aliphatic hydrocarbon radical R, this radical can also be introduced later into existing pyrazolidine derivatives by condensing 1.2-diaryl-3.5-dioxo-pyrazolidines of the general formula:

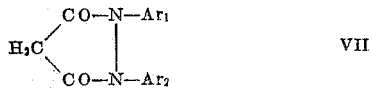

wherein $Ar_1$ and $Ar_2$ have the meanings given above, with an aliphatic oxo compound of the general formula:

wherein R' represents a geminate divalent radical corresponding to the radical R but having one hydrogen atom less, and simultaneously or later reacting with hydrogen which is catalytically activated, e. g. by means of noble metal catalysts or Raney nickel. 1.2-diaryl-3.5-dioxo-pyrazolidines of the general Formula VII can be produced in the same manner as described above for the 4-substituted compounds from unsubstituted malonic acid derivatives and hydrazobenzene or derivatives thereof of the general Formulas III and V. 1.2-diphenyl-, 1.2-bis-(p-methyl-phenyl)- and 1.2-bis-(p-methoxy-phenyl)-3.5-dioxo-pyrazolidine are known. Aldehydes having a straight chain which can be produced for example from the chlorides of corresponding fatty acids by hydrogenation according to Rosenmund are particularly suitable as oxo compounds of the general Formula VIII; known aldehydes of this series are, for example, lauraldehyde, tridecaldehyde, myristaldehyde, pentadecaldehyde, palmitaldehyde, heptadecaldehyde and stearaldehyde.

The new 4-substituted 1.2-diaryl-3.5-dioxo-pyrazolidines are mostly colourless crystalline substances which easily dissolve both in the usual organic solvents as well as in diluted aqueous alkalies due to the presence of an acid hydrogen atom, probably in the tautomeric enol form. Also the new compounds form salts with other inorganic as well as with organic bases.

In addition, the aqueous solutions of the alkali salts of the new compounds have the property of acting as solubility promoters on pyrazole derivatives.

The following examples serve to further illustrate the production of the new compounds. Parts are given as parts by weight and their relationship to parts by volume is as that of grammes to cubic centimetres.

*Example 1*

164 parts of n-dodecyl-malonic acid diethyl ester (B. $P_{0.5}=149–153°$) are added to a sodium ethylate solution of 11.5 parts of sodium and 230 parts by volume of abs. ethanol and then 92 parts of hydrazobenzene are added. Half of the alcohol is then distilled off while stirring, 115 parts by volume of abs. xylene are added and then, while heating for a further 12 hours, the lower boiling components are distilled off, the oil bath temperature being kept between 140 and 145°.

After cooling, 230 parts of water are stirred in. When all reaction products have dissolved, the layers are separated, the aqueous phase is shaken out twice with a little chloroform, made acid to Congo red paper with 6 N-hydrochloric acid, the precipitated oil is taken up in ether, the ethereal solution is washed first with water and then with saturated sodium chloride solution, dried with anhydrous sodium sulphate and evaporated. The residue is recrystallised twice from methanol and the 1.2-diphenyl-3.5-dioxo-4-n-dodecyl-pyrazolidine obtained melts at 74–75°.

1.2-diphenyl-3.5-dioxo-4-(n-octadeca-9'-enyl) - pyrazolidine is obtained in an analogous manner by using 205 parts of (n-octadeca-9-enyl)-malonic acid diethyl ester (B. $P_{0.4}$ 195–197°). The product crystallises from methanol only after standing for several days. M. P. 65–66°;

1.2-diphenyl-3.5-dioxo-4-n-octadecyl-pyrazolidine is obtained in an analogous manner by using 206 parts of n-octadecyl-malonic acid diethyl ester (B. $P_{0.12}$ 193–194°). It crystallises well from methanol and melts at 72–74°;

1.2-diphenyl-3.5-dioxo-4-n-pentadecyl - pyrazolidine is obtained in an analogous manner by using 185 parts of n-pentadecyl-malonic acid diethyl ester (B. $P_{0.15}$ 161–162°). It melts at 76–77° (from methanol);

1.2-bis-(m-methylmercapto-phenyl)-3.5-dioxo - 4 - n-dodecyl-pyrazolidine is obtained in an analogous manner by using 138 parts of m.m'-bis-methylmercapto-hydrazobenzene and 164 parts of n-dodecyl-malonic acid diethyl ester.

*Example 2*

15.5 parts of n-dodecyl-malonic acid dichloride in 50 parts of ether and 12.1 parts of dimethylaniline in 20 parts of ether are added dropwise simultaneously through separate dropping funnels at 0° while stirring to a suspension of 12.7 parts of p.p'-dimethyl hydrazobenzene (M. P. 130–131°) in 100 parts by volume of abs. ether. On completion of the addition, the whole is stirred first for 2 hours at 0°, the cooling mixture is then replaced by water of room temperature and finally it is boiled for a further hour under reflux. After cooling, 200 parts of ether are added and the insoluble dimethylaniline-hydrochloride is filtered off. The ether solution is shaken out with 1 N-caustic soda lye, the alkaline solution is shaken out once with ether and then the pH value is adjusted to 3 with hydrochloric acid. The 1.2-bis-(p-methylphenyl)-3.5-dioxo-4-n-dodecyl-pyrazolidine which precipitates is drawn off under suction, washed with a little ice water, dried and recrystallised, for example, from methanol.

By using 15 parts of p.p'-dichlorohydrazobenzene instead of p.p'-dimethyl hydrazobenzene, 1.2-bis-(p-chlorophenyl)-3.5-dioxo-4-n-dodecyl-pyrazolidine is obtained in an analogous manner, and by using 14.5 parts of p.p'-dimethoxy-hydrazobenzene, 1.2 - bis - (p-methoxy-phenyl)-3.5-dioxo-4-n-dodecyl-pyrazolidine is obtained in an analogous manner.

*Example 3*

8 parts of dry pyridine are added to a suspension of 18.4 parts of hydrazobenzene in 150 parts by volume of abs. benzene and while stirring and cooling with ice water, a mixture of 31.9 parts of n-dodecyl-malonic acid monoethyl ester chloride and 80 parts by volume of abs. benzene are added dropwise. The reaction mixture is then slowly warmed while stirring and finally boiled under reflux for half an hour. After cooling, the pyridine-hydrochloride which precipitates is drawn off under suction and washed several times with benzene. A sodium ethylate solution made up from 2.3 parts of sodium and 100 parts by volume of abs. ethanol is added to the benzene solution of n-dodecyl-malonic acid monoethyl ester-N.N'-diphenyl hydrazide so obtained, the addition being made at the boil within 4 hours while stirring and at the same time benzene and ethanol are distilled off from the reaction mixture with about equal rapidity. On completion of the addition of the sodium ethylate solution, the mixture of solvents is completely evaporated and the residue is heated for about 6 hours in the vacuum at 140–150°. After cooling, 80 parts of water are stirred in and then the product is worked up as described in Example 1. After recrystallisation from methanol, the 1.2-diphenyl-3.5-dioxo-4 - n - dodecyl - pyrazolidine which has already been described in Example 1 is obtained. It melts at 74–75°.

What we claim is:

1.2-diphenyl-4-n-octadecyl-3.5-dioxo-pyrazolidine.

References Cited in the file of this patent

UNITED STATES PATENTS

| | | | |
|---|---|---|---|
| 2,562,830 | Stenzl | | July 31, 1951 |

FOREIGN PATENTS

| | | | |
|---|---|---|---|
| 646,597 | Great Britain | | Nov. 22, 1950 |
| 707,611 | Great Britain | | Apr. 21, 1954 |
| 167,282 | Austria | | Dec. 11, 1950 |